US011856421B2

(12) United States Patent
Thurfjell et al.

(10) Patent No.: US 11,856,421 B2
(45) Date of Patent: Dec. 26, 2023

(54) FIRST NODE, THIRD NODE, AND METHODS THEREBY, FOR MANAGING A MOVEMENT OF A RADIO ANTENNA

(71) Applicant: Telefonaktiebolaget LM Ericsson (publ), Stockholm (SE)

(72) Inventors: Magnus Thurfjell, Luleå (SE); Peter Ökvist, Luleå (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 870 days.

(21) Appl. No.: 16/499,412

(22) PCT Filed: Mar. 28, 2017

(86) PCT No.: PCT/SE2017/050292
§ 371 (c)(1),
(2) Date: Sep. 30, 2019

(87) PCT Pub. No.: WO2018/182468
PCT Pub. Date: Oct. 4, 2018

(65) Prior Publication Data
US 2021/0168630 A1   Jun. 3, 2021

(51) Int. Cl.
*H04W 24/04* (2009.01)
*G01S 11/10* (2006.01)
*H04W 72/044* (2023.01)
*H04W 88/08* (2009.01)

(52) U.S. Cl.
CPC ............ *H04W 24/04* (2013.01); *G01S 11/10* (2013.01); *H04W 72/044* (2013.01); *H04W 88/08* (2013.01)

(58) Field of Classification Search
CPC ..... G01S 11/10; H04W 24/04; H04W 72/044; H04W 88/08
See application file for complete search history.

(56) References Cited

U.S. PATENT DOCUMENTS

2007/0232359 A1* 10/2007 Pinheiro ............. H04B 7/0695
455/562.1
2009/0141623 A1* 6/2009 Jung ...................... H01Q 25/00
455/562.1
(Continued)

FOREIGN PATENT DOCUMENTS

| CN | 101675694 A | 3/2010 |
|---|---|---|
| CN | 104395774 A | 3/2015 |
| JP | 2001202587 A | 7/2001 |

OTHER PUBLICATIONS

Unknown, Author, "Light Standards Effects of Vibration", Lithonia Lighting, Light Standards Technical Bulletin, Jun. 8, 2007, pp. 1-4.
(Continued)

*Primary Examiner* — Nguyen T Vo
(74) *Attorney, Agent, or Firm* — SAGE PATENT GROUP (57) ABSTRACT

Method performed by a first node (101) for managing a movement of a radio antenna (120). The first node (101) operates in a wireless communications network (100). The first node (101) determines (302) whether the movement of the radio antenna (120) is above a threshold over a time period. The radio antenna (120) is connected to a second node (102) operating in the wireless communications network (100). The movement is with respect to at least one wireless device (140) operating in the wireless communications network (100). The determining (302) is based on an analysis of one or more properties of radio transmissions to or from the radio antenna (120) over the time period. The first node (101) initiates (304) providing a message to one of: the second node (102) and a third node (103) operating in the wireless communications network (100). The initiation is based on a result of the determination.

12 Claims, 7 Drawing Sheets

(56) References Cited

U.S. PATENT DOCUMENTS

| | | | |
|---|---|---|---|
| 2009/0201203 A1* | 8/2009 | Le Sage | G01S 19/53 342/357.29 |
| 2010/0103892 A1 | 4/2010 | Abrahamsson et al. | |
| 2013/0099497 A1* | 4/2013 | Bowyer | F03D 7/0204 290/44 |
| 2013/0344901 A1 | 12/2013 | Garin et al. | |
| 2014/0086122 A1* | 3/2014 | Gupta | H04B 7/0486 370/328 |
| 2016/0146943 A1* | 5/2016 | Knibbe | G01S 19/14 342/357.52 |
| 2017/0045623 A1* | 2/2017 | Zlogar | G01S 3/14 |
| 2018/0014213 A1* | 1/2018 | Bennett | H04W 24/04 |
| 2018/0115046 A1* | 4/2018 | Wennström | H01Q 1/1228 |

OTHER PUBLICATIONS

Briden, Richard, "Light poles: A guide to the selection, installation and maintenance including the cause and effects of pole vibration.", White Paper WP513001EN, Jan. 15, 2016, pp. 1-10.

Crosby, Adam, "Special Research Topic Report on Current Practice in Utility Distribution Poles and Light Poles", May 5, 2011, pp. 1-24.

Flather, Wayne, "Wind Induced Vibrations of Pole Structures", A Project Report Presented to the Department of Civil and Geological Engineering Faculty of Engineering; The University of Manitoba, Jun. 1997, pp. 1-76.

Giosan, I, et al., "Vortex Shedding Induced Loads on Free Standing Structures", Structural Vortex Shedding Response Estimation Methodology and Finite Element Simulation, 2013, pp. 1-42.

Unknown, Author, "3rd Generation Partnership Project; Technical Specification Group Services and System Aspects; Study on Architecture for Next Generation System (Release 14)", 3GPP TR 23.799 V1.1.0, Oct. 2016, 501 pages.

First Chinese Office Action for Chinese Patent Application No. CN 201780089110.1 dated Mar. 31, 2023, 13 pages (including English translation).

Manis, Pete, et al.; "Wind Induced Vibrations on Light Standards"; Structure Magazine, Mar. 2008; 2 pages.

* cited by examiner

FIRST NODE, THIRD NODE, AND METHODS THEREBY, FOR MANAGING A MOVEMENT OF A RADIO ANTENNA

TECHNICAL FIELD

The present disclosure relates generally to a first node and methods performed thereby for managing a movement of a radio antenna. The present disclosure relates generally to a third node and methods performed thereby for managing the movement of the radio antenna. The present disclosure further relates to computer program products, comprising instructions to carry out the actions described herein, as performed by the first node, and the third node. The computer program products may be stored on computer-readable storage mediums.

BACKGROUND

Wireless devices within a wireless communications network may be e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

In the context of this disclosure, the expression Downlink (DL) is used for the transmission path from the base station to the wireless device. The expression Uplink (UL) is used for the transmission path in the opposite direction i.e., from the wireless device to the base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN. The current understanding of various concepts related to this work may be based on input from 3GPP TS 23.799 v1.1.0.

The 5G RAN may comprise base stations supporting evolved LTE and/or New Radio (NR) radio access. In 5G RAN, base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

With introduction of the 5G technology, gigabit over-the-air mobile systems may most likely emerge. One foreseen application of the emerging 5G access is to substitute content, e.g., TV content, distribution over wireline accesses with wireless accesses. In that context, the radio connection may be represented by a non-mobility fixed point-to-point connection. Such connections may often be manifested by some sort of Fixed Wireless Terminals (FWT). FWT may be understood as wireless devices as described above, but they are limited to an almost permanent location with almost no roaming abilities. FWT are considered being substitutions for 'Fiber To The Home' (FTTH), a.k.a. "Fiber To The Premises" (FTTP). FTTH may be understood as a form of fiber-optic communication delivery, in which an optical fiber is run in an optical distribution network from the central office all the way to living space or a home. In everyday speech, this emerging trend is often described as deployment of "wireless fiber".

In foreseen installations, preferred deployments to achieve sufficiently high end user performance may likely strive to maintain Line-of-Sight (LoS) between as many Customer-Premises Equipment (CPE) and Transmission Points (TPs) as possible. Typical mounting points of TPs may be at different kinds of poles in the area; for example light poles, utility pole sites, or re-using current, if any, macro cellular grid. CPEs are potentially either installed at roof-tops, being wall-mounted, outdoors, or user-deployed in some suitable indoor placement, i.e., behind some, preferably, TP-facing window. Other solutions described may be indoor customer-deployed CPEs.

Related to the physical installation on site, wind load may induce harmonic oscillations to "tall" vertical structures, such as radio antennas, or the pole structures they may be installed in, and depending on the inherited physical dimensions of the construction, said vibrations may become differently large. In classical mechanics, a harmonic oscillator may be understood as a system that when displaced from its equilibrium position, experiences a restoring force proportional to the corresponding displacement, resulting in so-called harmonic oscillations. The system may oscillate as it undergoes harmonic motion, typically in terms of, e.g., sinusoidal oscillations about the equilibrium point with a constant amplitude and a constant frequency. The harmonic oscillator may be damped if a frictional force proportional to the velocity is also present, the harmonic oscillator. Resonance may be understood as the tendency of a mechanical system to respond at greater amplitude when the frequency of its oscillations matches the natural frequency of vibration of the system, that is, its resonance frequency, i.e. harmonic oscillations, than it does at other frequencies. It may cause violent swaying motions and even catastrophic failure in improperly constructed structures including bridges, buildings, etc.

With certain circumstances fulfilled, wind speeds of 5-10 meters per second (m/s) may be enough to bring poles structures into significant vibrations, such as described in in "Wind Induced Vibrations of Pole Structure" published at http://www.collectionscanada.gc.ca/obj/s4/f2/dsk2/ftp04/mq23302.pdf, "Vortex Shedding Induced Loads on Free Standing Structure—Structural Vortex Shedding Response Estimation Methodology and Finite Element Simulation" published at http://citeseerx.ist.psu.edu/viewdoc/download?doi=10.1.1.582.3179&rep=rep1&type=pdf, "Special Research Topic Report on Current Practice In Utility Distribution Poles and Light Poles", Kornegay Engineering—Structural Consulting for Middle Georgia (2011) published at http://www.kornegayengineering.com/wp-content/uploads/2011/05/structural-utility-distribution-light-poles-whitepaper-acrosby.pdf, "Light Standards—Effects of Vibration" published at http://www.lithonia.com/microwebs/pdfs/pole-vibration.pdf, "A guide to the selection, installation and maintenance including the cause and effects of pole vibration", White Paper WP513001EN, Jan. 15, 2016, published at http://www.cooperindustries.com/content/dam/public/lighting/resources/library/literature/In vue1/wp513001en-light-poles-white-paper-bro.pdf, and "Wind Harmonics, Acuity Academy", published at http://www.acuitybrands.com/resources/tools-and-documents/pole-resources/wind-harmonics.

Figure 1:
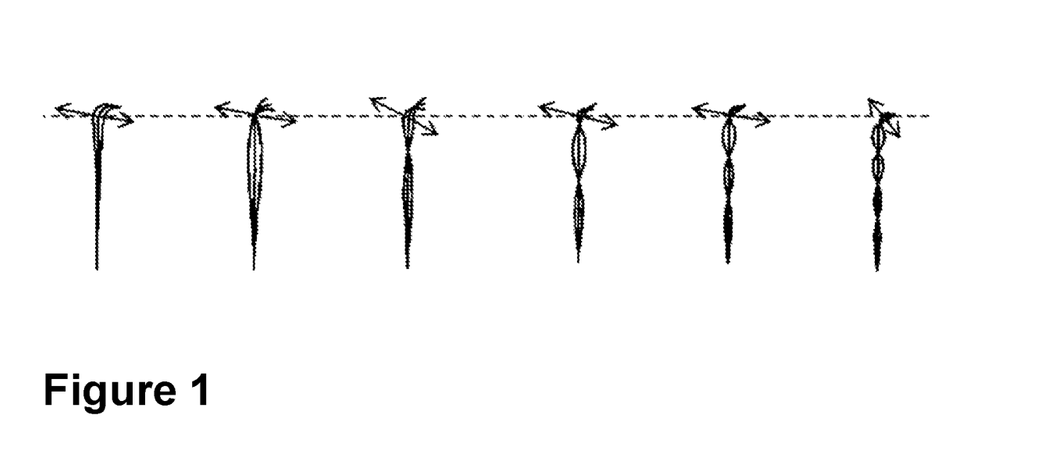
FIG. 1 is a schematic representation illustrating mode shape for six lowest natural frequencies.

Typical assessments of oscillations of pole structures or radio antennas, show on oscillations frequencies in the range of 1 Hertz (Hz) for a first mode of vibration, 3-8 Hz for a second mode, and up to 25 Hz for e.g. a sixth mode. A mode may be understood as a standing wave state of excitation. A mode of vibration may be characterized by a modal frequency and a mode shape. FIG. 1 is a schematic representation illustrating mode shape for six lowest natural frequencies, with a lowest mode shown on the left, and the sixth mode to the right. Mode shape may be understood as the envelope of the vibrational dislocation; typically the maximum/minimum point of the vibrational movement. FIG. 1 typically illustrates these "envelopes" of the vibrational dislocation for each of the resonance states of the vibration. Resonance may be interpreted as when a vibrating system drives another system to oscillate with greater amplitude at a specific preferential frequency. Natural frequencies may be understood as resonance frequencies. The arrows in FIG. 1 illustrate that an antenna mounted at a certain location along a pole will somehow be dislocated when pole starts to vibrate. In FIG. 1, the dashed line illustrates intended antenna direction. Misdirected directions are exemplified by arrows.

The modes of vibration above the lowest one may be considered as having critical impact on structure integrity.

In practice, induced harmonic oscillation may cause material fatigue, which if omitted may cause failure and costly site rebuilds.

SUMMARY

It is an object of the embodiments herein to improve the maintenance of mechanical structures in a wireless communications network. It is a particular object of the embodiments herein to improve the management of a movement of a radio antenna in a wireless communications network.

According to a first aspect of embodiments herein, the object is achieved by a method performed by a first node. The method is for managing a movement of a radio antenna. The first node operates in a wireless communications network. The first node determines whether the movement of the radio antenna is above a threshold over a time period. The radio antenna is connected to a second node operating in the wireless communications network. The movement is with respect to at least one wireless device operating in the wireless communications network. The determining is based on an analysis of one or more properties of radio transmissions to or from the radio antenna over the time period. The first node initiates providing a message to one of: the second node and a third node operating in the wireless communications network. The initiation of the providing of the message is based on a result of the determination.

According to a second aspect of embodiments herein, the object is achieved by a method performed by the third node. The method is for managing the movement of the radio antenna. The third node operates in the wireless communications network. The third node receives the message from the first node operating in the wireless communications network. The receiving of the message is based on a result of a determination of whether the movement of the radio antenna is above the threshold over the time period. The radio antenna is connected to the second node operating in the wireless communications network. The movement is with respect to at least the one wireless device operating in the wireless communications network. The determination is based on the analysis of the one or more properties of the radio transmissions between the at least one wireless device and the radio antenna over the time period.

According to a third aspect of embodiments herein, the object is achieved by a first node configured for managing the movement of the radio antenna. The first node is configured to operate in the wireless communications network. The first node is further configured to determine whether the movement of the radio antenna is above the threshold over the time period. The radio antenna is configured to be connected to the second node configured to operate in the wireless communications network. The movement is with respect to the at least one wireless device configured to operate in the wireless communications network. To determine is configured to be based on the analysis of the one or more properties of the radio transmissions to or from the radio antenna over the time period. The first node is further configured to initiate providing the message to one of: the second node and the third node configured to operate in the wireless communications network. The initiation of the providing of the message is configured to be based on the result of the determination.

According to a fourth aspect of embodiments herein, the object is achieved by a third node. The third node is configured to manage the movement of the radio antenna, the third node is further configured to operate in the wireless communications network. The third node is further configured to receive the message from the first node configured to operate in the wireless communications network. To receive the message is configured to be based on the result of the determination of whether the movement of the radio antenna is above the threshold over the time period. The radio antenna is configured to be connected to the second node configured to operate in the wireless communications network. The movement is with respect to the at least one wireless device configured to operate in the wireless communications network. The determination is configured to be based on the analysis of the one or more properties of the radio transmissions between the at least one wireless device and the radio antenna over the time period.

According to a fifth aspect of embodiments herein, the object is achieved by a computer program. The computer program comprises instructions which, when executed on at least one processor, cause the at least one processor to carry out the method performed by the first node.

According to a sixth aspect of embodiments herein, the object is achieved by a computer-readable storage medium. The computer-readable storage medium has stored thereon a computer program comprising instructions which, when executed on at least one processor, cause the at least one processor to carry out the method performed by the first node.

According to a seventh aspect of embodiments herein, the object is achieved by a computer program. The computer program comprises instructions which, when executed on at least one processor, cause the at least one processor to carry out the method performed by the third node.

According to an eighth aspect of embodiments herein, the object is achieved by a computer-readable storage medium. The computer-readable storage medium has stored thereon a computer program comprising instructions which, when executed on at least one processor, cause the at least one processor to carry out the method performed by the third node.

By determining whether the movement of the radio antenna is above the threshold over the time period based on the analysis of the one or more properties of the radio transmissions to or from the radio antenna, and initiating providing the message to the second node or third node, the first node is enabled to manage the movement of the radio antenna by monitoring it, and notifying another node, such as the third node, thereby enabling the performance of an action to remedy the movement. That is, any harmful effect the movement may have or may be expected to have on the radio antenna and any associated equipment. This may be performed by the radio node, without requiring dedicated equipment, such as accelerometers, strain gauges, etc. . . . Hence, the managing of the movement may be performed with lower cost, complexity and involving fewer experts specialized personnel than existing methods.

BRIEF DESCRIPTION OF THE DRAWINGS

Examples of embodiments herein are described in more detail with reference to the accompanying drawings, and according to the following description.

DETAILED DESCRIPTION

As part of the development of the embodiments disclosed herein, a problem associated with existing methods will first be identified and discussed.

As described in the background section, oscillations, e.g., harmonic oscillations induced by the wind may cause torsional and transversal oscillation modes, that is, twisting and shivering modes, into a pole structure, or a radio antenna.

Efficient load, e.g. wind load, and/or oscillation cycle monitoring that may trigger preemptive site pole maintenance is advantageous in terms of preventing total structural failure caused by material fatigue. Existing methods in maintenance of mechanical structures require that structural vibrations are detected and monitored with dedicated equipment, such as accelerometers, strain gauges, etc., which in turn are connected, in some wired or wireless manner, to their own dedicated infrastructure. Given that accelerometers, and/or other dedicated equipment require some dedicated infrastructure, such dedicated equipment has a high cost the cost and requires maintenance all by itself. Moreover sensor, infrastructure operations, which may also be required, add to the cost. This may result in that pole owners may prone to turn down such investments, and that a pole may likely lack any structural monitoring. Structural damages caused by e.g., wind oscillations will, however, represent an even larger cost to its operator.

Embodiments herein address the foregoing problems of the existing methods by enabling to obtain similar vibrational information of mechanical structures such as a radio antenna, from equipment installed for other purposes, for example using radio properties of installed radio equipment, such as, for example, 5G equipment. In general, embodiments herein may be understood to relate to a method for identifying harmful oscillations in a mechanical structure. The identification of the harmful oscillations may be performed by detection of oscillation, such as harmonic oscillation, of the mechanical structure, e.g., radio antenna, or a radio antenna. As a summarized overview, embodiments herein may be understood to relate to a method to use information derived from a Doppler spectrum to identify and classify structural vibrations e.g., in radio towers. Embodiments herein may be understood to further relate to a method to use said information to monitor or predict structural damage to the radio towers, local wind conditions, or seismic activity.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 2:
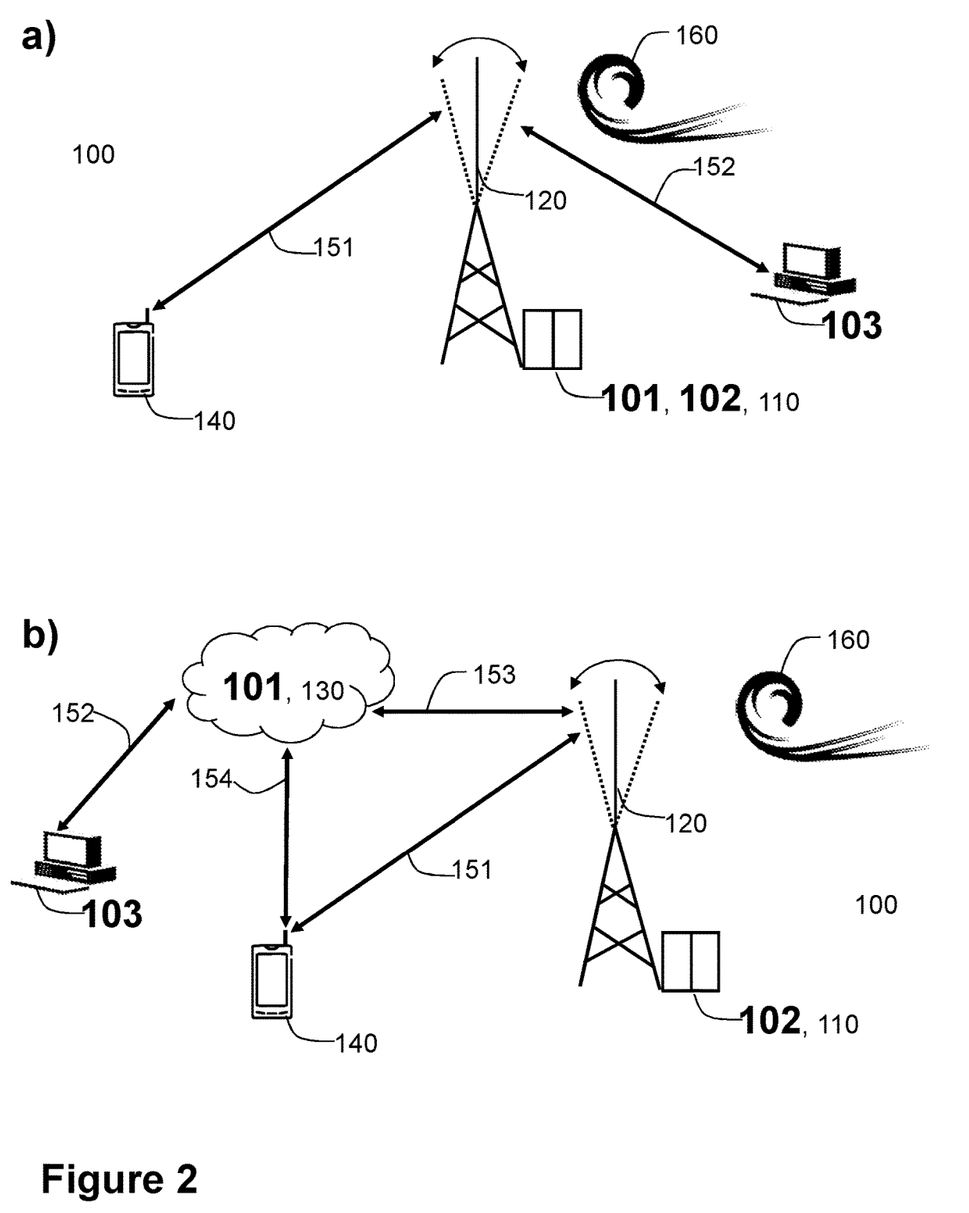
FIG. 2 is a schematic diagram illustrating two different examples of a wireless communications network, according to embodiments herein.

FIG. 2 depicts two non-limiting examples, in panels a and b respectively, of a wireless communications network 100, sometimes also referred to as a radio system, radio network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g.

Multi-Standard Radio (MSR) base stations, multi-RAT base stations etc., any 3rd Generation Partnership Project (3GPP) cellular network, WiFi network, Worldwide Interoperability for Microwave Access (WiMax), 3GPP New Radio (NR) or another 5G system or any cellular network or system. Thus, although terminology from LTE may be used in this disclosure to exemplify embodiments herein, this should not be seen as limiting the scope of the embodiments herein to only the aforementioned system. Other wireless systems may also benefit from exploiting the ideas covered within this disclosure. It may also be understood that the wireless communication network 100 may operate in one or more of licensed, license assisted, and unlicensed spectrum.

The wireless communications network 100 comprises a plurality of nodes whereof a first node 101, a second node 102, and a third node 103 are depicted in both examples of FIG. 2. Each of the first node 101 and the third node 103 may be a network node such as the network node 110 described below. The second node 102 is a network node 110 as described below, and has a radio antenna 120 connected to it, which may be a single array or a multi-array antenna. That the radio antenna 120 is connected to the second node 102 may be understood that they are arranged for communicating with each other. In some particular examples, in fact the typical examples, the radio antenna 120 and the second node 102 may be physically co-located or attached as part of a same physical structure, e.g., as part of a same base station.

Typically, as depicted in panel a) of FIG. 2, the first node 101 may be the same network node as the second node 102.

In some alternative examples, such as that depicted in panel b) of FIG. 2, the first node 101 may be another node in the wireless communications network 100, for example, a node in the cloud 130. That is, a so-called virtual node or virtual machine. In yet other examples, the first node 101 may be, e.g., a core network node, such as, e.g., Mobility Management Entity (MME), Self-Optimizing/Organizing Network (SON) node, a coordinating node, positioning node, Minimization of Drive Test (MDT) node, etc. . . . or a different logical entity than the second node 102.

The third node 103 may be, in some examples, a wireless device, such as the wireless device 140 described below, or a communication device that is enabled to operate in the wireless communications network 100 via a wired connection. For example, the third node 103, as depicted in FIG. 2, may be a desktop.

The wireless communications network 100 comprises a plurality of network nodes whereof a network node 110 is depicted in FIG. 2. In some embodiments, the network node 110 may be a radio network node such as e.g., a Transmission Point, a base station, an eNB, eNodeB, or a Home Node B, a Home eNodeB, femto Base Station, BS, Radio Access Point, Remote Radio Unit (RRU), Remote Radio Head (RRH), or any other network unit capable to serve a wireless device or a machine type node in the wireless communications network 100. In such embodiments, the network node 110 may be e.g., a Wide Area Base Station, Medium Range Base Station, Local Area Base Station and Home Base Station, based on transmission power and thereby also coverage size. The network node 110 may be a stationary relay node or a mobile relay node. The network node 110 may support one or several communication technologies, and its name may depend on the technology and terminology used. In some non-limiting examples, the network node 110 may serve receiving nodes with serving beam-formed beams, which may also be referred to herein simply as beams. In some embodiments, the network node 110 may correspond to any type of radio network node or any network node, which communicates with another radio network node or wireless device.

In 3GPP LTE and 5G RAN, any of the first node 101, the second node 102 and the third node 103 may be directly connected to one or more networks.

The wireless communications network 100 comprises at least one wireless device 140. In the example scenario of FIG. 2, only the one wireless device 140 is shown to simplify the Figure. The one wireless device 140 may also be referred to herein as the wireless device 140. The wireless device 140, such as a UE, may be also known as e.g. mobile terminal, wireless terminal and/or mobile station, mobile telephone, cellular telephone, or laptop with wireless capability, or a CPE, just to mention some further examples. The wireless device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the wireless communications network 100. The wireless device 140 may be wireless, i.e., it may be enabled to communicate wirelessly in the wireless communication network 100 and, in some particular examples, may be able support beamforming transmission. The communication may be performed e.g., between two devices, between a device and a network node, and/or between a device and a server. The communication may be performed e.g., via a RAN and possibly one or more core networks, comprised within the wireless communications network 100. In a typical scenario, the second node 102 may be a transmission point serving the wireless device 140, as depicted in both examples of FIG. 2.

The second node 102 may communicate with the wireless device 140 over a first link 151, e.g., a radio link. The first node 102 may communicate with the third node 103 over a second link 152, e.g., a radio link or a wired link. The first node 101 may communicate with the second node 102 over a third link 153, e.g., a radio link or a wired link, e.g., in examples where they are co-located. The first node 101 may communicate with the wireless device 140 over a fourth link 154, e.g., a radio link.

Any reference herein to the terms "first", "second", "third" or "fourth" will be understood to refer a manner of distinguishing between different instances of the terms they may modify. "First", "second", "third" or "fourth" are not intended to confer a cumulative or chronological meaning to the terms they modify.

Figure 3:
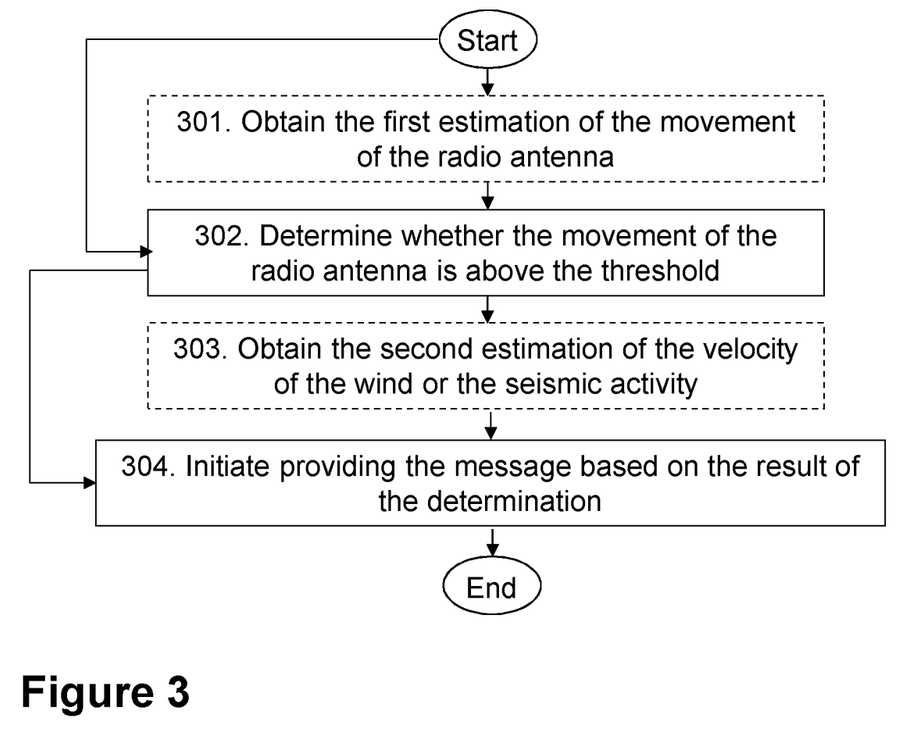
FIG. 3 is a flowchart depicting embodiments of a method in a first node, according to embodiments herein.

Embodiments of a method performed by a first node 101, the method being for managing a movement of the radio antenna 120, will now be described with reference to the flowchart depicted depicted in FIG. 3. The first node 101 operates in the wireless communications network 100.

The method may comprise the actions described below. In some embodiments all the actions may be performed. In some embodiments, one or more actions may be performed. The order in which the actions are performed may be different than that depicted in FIG. 3. One or more embodiments may be combined, where applicable. All possible combinations are not described to simplify the description. In FIG. 3, optional actions are indicated with dashed lines.

Action 301

Embodiments herein may be understood to aim at identifying oscillations, e.g., harmonic oscillations, of the mechanical structure, e.g., radio antenna, or a radio antenna. in a vertical structure, such as a pole structure or the radio antenna 120, which may be harmful for the physical integrity of the mechanical structure.

In order to eventually detect if there are such oscillations, and if they are harmful, in this Action 301, the first node 101 may obtain a first estimation. The first estimation is of the movement of the radio antenna 120. Obtaining may be understood as determining or calculating itself, or receiving or fetching from another node in the wireless communications network 100.

The movement of the radio antenna 120 may be understood as a displacement in two or three dimensions of the radio antenna 120. The movement may be caused by a wind 160 or a seismic activity exerting a force on the radio antenna 120.

The movement may be detected or measured herein based on an analysis of one or more properties of radio transmissions to or from the radio antenna 120 over a time period. The radio transmissions may comprise reference signals. That the radio transmissions are to or from the radio antenna 120 may be understood as that the radio transmissions may be one of: a) transmitted by the second node 102 and measured by the at least one wireless device 140; and b) transmitted by the at least one wireless device 140 and measured by the second node 102. In examples wherein the radio transmissions are transmitted by the second node 102, the radio transmissions may be e.g., Cell Specific Reference Signal (CRS), or Demodulation Reference Signals (DMRS). In examples wherein the radio transmissions are transmitted by the at least one wireless device 140, the radio transmissions may be e.g., Sounding Reference Signals (SRS).

In accordance with this, the movement of the radio antenna 120 may be understood herein to be with respect to the at least one wireless device 140 operating in the wireless communications network 100. In some examples, the movement may be with respect to a plurality of wireless devices such as the at least one wireless device 140. For example, the plurality of wireless devices may served by the second node 102. The at least one wireless device 140 may be assumed to be static, or moving, but that its movement is unchanging, e.g., moving at a constant speed, not oscillating or changing its movement frequently. In the examples wherein the at least one wireless device 140 comprises a plurality of wireless devices, any oscillation on the individual wireless devices may be assumed to be evened out among the plurality.

Figure 4:
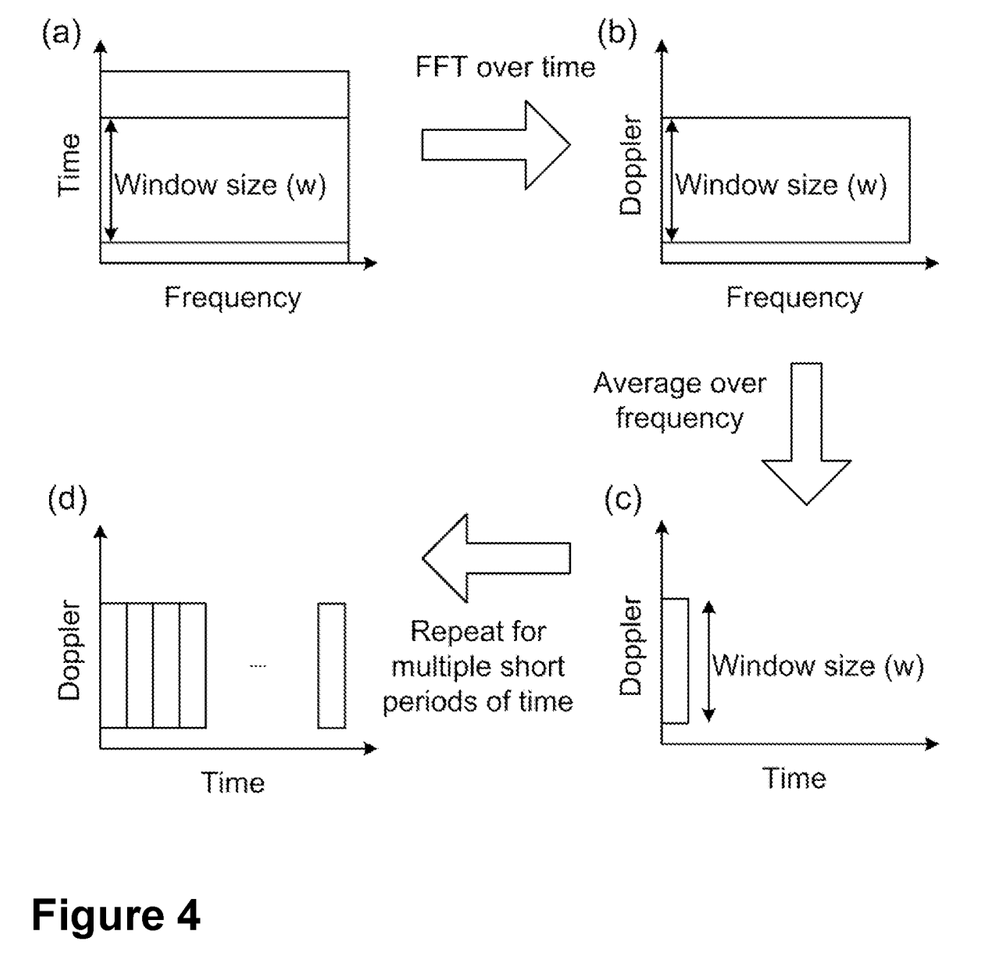
FIG. 4 schematically illustrates how to obtain a set of Doppler spectrum values in embodiments herein.

The one or more properties of radio transmissions may comprise, for example, phase of a transmission channel, and additionally an amplitude of the transmission channel. In some embodiments, the analysis may be based on: a) obtained measurements of at least a phase of the radio transmissions over the time period; b) a division of the obtained measurements in subsets of periods of time comprised in the time period; and c) a Fourier transform over each of the subsets of periods of time. The obtaining of the first estimation in this Action 301 may then be further based on a set of Doppler spectrum values obtained from the Fourier transform over each of the subsets of periods of time. This process is schematically represented In FIG. 4, which is described later.

According to the foregoing, in some embodiments, the analysis may be a Doppler spectrum analysis. The first estimation may be based on at least one of: i) calculating a frequency of the movement of the radio antenna 120, based on time variations of the set of Doppler spectrum values, and ii) calculating an amplitude of the movement of the radio antenna 120, based on the values in set of Doppler spectrum values. For example, the amplitude of the movement of the radio antenna 120 may be calculated based on the integral of the values in the set of Doppler spectrum values. The analysis may be then based on a detection of a time-harmonic variation of the set of Doppler spectrum values. For example, this may be performed in relation to the oscillations depicted in FIG. 1.

For calculating the frequency of the movement of the radio antenna 120, based on time variations of the set of Doppler spectrum values, the Doppler value for each subset of time may represent a velocity of the radio antenna 120 at that moment in time. By integrating the set of velocities, the position variations may be obtained and hence, e.g., the amplitude.

In some examples, the analysis may be entirely performed by the first node 101. In other words, the first node 101 may first, measure an amplitude and a phase of a transmission channel, e.g., the first link 151, between the second node 102 and the at least one wireless device 140, repeatedly over time. The first node 101 may then divide the resulting measurement data in into certain groups of time, for example, groups covering short periods of time. Next, the first node 101 may perform a Fourier transform over the time domain for each group to produce the set of Doppler spectrum values. The first node 101 may then detect time-harmonic variation in the achieved Doppler spectrum, that is, the set of Doppler spectrum values.

The first node 101 may then obtain itself, or from another node in the wireless communications network 100, at least one of: a) a calculation of a first measure of a corresponding frequency of the movement or oscillations of the radio antenna 120 by analyzing time variations of the set of Doppler spectrum values, and b) a calculation of a second measure of a corresponding amplitude of the movement of the radio antenna 120 from the set of Doppler spectrum values.

In other examples, one or more of the steps of the analysis, e.g., any of the measurements, the division and the Fourier transform may be performed by another node or nodes, in the wireless communications network 100, e.g., by the second node 102 or, and then obtained or received by the first node 101. This may be the case for example, in examples wherein the first node 101 and the second node 102 are different nodes. Accordingly this Action 301 is option.

Action 302

In order to detect if the oscillations of the radio antenna 120 are harmful, in this Action 302, the first node 101 determines whether the movement of the radio antenna 120 is above a threshold over the time period. Determining may be understood as calculating. As described earlier, the radio antenna 120 is connected to the second node 102 operating in the wireless communications network 100. The movement is with respect to the at least one wireless device 140, operating in the wireless communications network 100. The determining is based on the analysis of the one or more properties of the radio transmissions to or from the radio antenna 120 over the time period. The analysis may be understood to be obtained by the first node 101. In some examples, the analysis may be understood to be obtained by the first node 101, autonomously, as described in Action 301. In other examples, the analysis may be performed as described in Action 301, but by another node or nodes in the wireless communications network 100. The analysis may then be obtained by the first node 101 by receiving or fetching it.

In some examples, the determining in this Action 302 may be based on the first estimation of the movement of the radio antenna 120, obtained as described in Action 301. In other examples, the determining may be based on a similar first estimation, obtained by another node or nodes in the wireless communications network 100, and then obtained, that is, received or fetched, by the first node 101.

In some embodiments, the determination in this Action 302 may be further based on a detection of a time-harmonic variation of the set of Doppler spectrum values. In some embodiments, the determining 302 may be further based on the set of Doppler spectrum values obtained from the Fourier transform over each of the subsets of periods of time, as described in Action 301.

The threshold may be different for different criteria. For example, the determination in this Action 302 may comprise determining if any, or both, of the first measure of the corresponding frequency and the second measure of the corresponding amplitude of the radio antenna 120, as described in Action 301, over the time period are above a first threshold, such as an established threshold of maintenance, e.g., a threshold_of_maintenance, or a second threshold, such as a threshold of structural integrity, e.g., a threshold_of_structural_integrity. The threshold of maintenance may be understood as a threshold above which maintenance is required for the mast construction to prevent it from physically breaking. The threshold of structural integrity may be understood as a threshold reflecting vibrations in handheld tools. It may be measured in "time-averaged acceleration", typically as "averaged acceleration over X working hours". Over the time period may be understood as comprising any of e.g., time-averaged, instant, etc. . . .

The time period may be, for example a number of minutes.

Action 303

In this Action 303, the first node 101 may obtain, based on the result of the determination of Action 302, a second estimation of one of: a) a velocity of the wind 160 and b) the seismic activity. The velocity of the wind 160 may be understood to comprise a speed of the wind 160. In some examples, the velocity of the wind 160 may also comprise a direction of the wind 160.

The velocity of the wind 160 may be estimated for example by analyzing oscillation modes with respect to amplitude and frequency. The direction of the wind may be for example deducted by analyzing the direction of the vibrations from a plurality of wireless devices.

The first node 101 may then map the movement, e.g., the harmonic oscillation, of the radio antenna 120 to the estimated velocity of the wind 160. The first node 101 may for example, measure a path loss of the radio transmissions. The first node 101 may then obtain a measure of, or itself detect a time-harmonic variation in the set of Doppler spectrum values, and calculate the first measure of the corresponding frequency and, optionally, additionally calculate the second measure of the corresponding amplitude of the radio antenna 120, as described in Action 301. Next, the first node 101 may map a calculated oscillation of the corresponding frequency and, optionally of the corresponding amplitude, to the obtained second estimation of the velocity of the wind 160. This may be done based on a height of a tower the radio antenna 120 may be located, a weight of a mounted equipment of the radio antenna 120, etc. . . .

The seismic activity may be estimated for example by analyzing the vibrational characteristics of the movement of the radio antenna 120 and determining if they correspond to a pattern of wind load, or to a pattern caused by seismic activity, e.g., by the type of radio antenna 120, type of mast it may be mounted on, and its position and surroundings. In some non-limiting examples, the seismic activity may be estimated for example by first determining the second estimation of the velocity of the wind 160 and, if no correlation may be established with the movement of the radio antenna 120, as e.g., obtained in Action 301, the radio node 101 may determine that the detected movement of the radio antenna 120 may be caused by seismic activity. The radio node 101 may base the second estimation of the seismic activity on an analysis of such a correlation between the movement of the radio antenna 120 and the velocity of the wind 160 at a number of network nodes, based on geographical area.

In some examples, this Action 303 may be performed after Action 304 instead of before.

This is an optional Action.

Action 304

In this Action 304, the first node 101 initiates providing a message to one of: the second node 102, e.g., via the third link 153, and the third node 103 operating in the wireless communications network 100, e.g., via the second link 152. The initiation of the providing of the message is based on a result of the determination. To initiate providing may be understood as to trigger the providing, e.g., by instructing or enabling another node to perform the providing, or to autonomously perform the providing. Providing may be understood as e.g., sending, or transmitting.

That the initiation of the providing of the message is based on a result of the determination may be understood as that the first node 101 may only initiate the providing of the message in this Action 304 when the movement of the radio antenna 120 is above the threshold over the time period, but not otherwise.

The message may either comprise a notification to another node regarding the obtained determination in Action 302, or a report deriving from it, e.g., a weather report, or a report on seismic activity. A notification may comprise an alarm, a written notification, a light pattern, a sound, or another form of notification. A remedial action may be understood as an action that contributes to counteracting the harmful effect of the movement of the radio node 120. The message may alternatively, or in addition, provide a recommendation or an instruction to perform a remedial action for the detected harmful movement. Hence, in some embodiments, the message may trigger at least one of: a) a report regarding maintenance of the radio antenna 120; b) shut down of the radio antenna 120; c) a report of a weather condition, e.g., a report of the second estimation of the velocity of the wind 160; and d) a report on seismic activity. For example, the first node 101 may instruct the second node 102 directly to shut down the radio antenna 120 if the movement of the radio antenna 120 is above the threshold over the time period. In another example, the first node 101 may send the report on seismic activity to the second node 102 for transmission to another node in the wireless communications network 100.

In examples wherein the message may be a report of the weather condition, the third node 103 may be a weather-entity in Operational Support Systems (OSS). The third node 103 may also be a wireless device located in a news station or a seismic control center. In some examples, before initiating providing the message, the first node 101 may first gather weather information from multiple sites into a weather map and or a weather forecast.

There may be different thresholds for initiating providing different types of messages. For example, if the first node 101 determines in Action 302 may that any, or both, of the first measure of the corresponding frequency of the movement or oscillations of the radio antenna 120 and the second measure of the corresponding amplitude of the movement or oscillations of the radio antenna 120, as described in Action 301, over the time period is above the threshold of maintenance, the first measure and the second measure being time-averaged, the first node 101 may trigger pro-active site maintenance through the message by triggering a first set of selected actions.

In another example, if the first node 101 determines in Action 302 that any, or both, of the first measure of the corresponding frequency of the movement or oscillations of the radio antenna 120 and the second measure of the corresponding amplitude of the movement or oscillations of the radio antenna 120, as described in Action 301, over the time period is above the threshold of structural integrity, the first measure and the second measure being instant measures, the first node 101 may trigger through the message a second set of selected actions, such as one or more of: sending a critical alarm, re-organizing, e.g., in some SON-like manner, a radio grid to cope with an upcoming scenario such as, e.g., "site X may suffer structural damages within X hours given current vibrations". The first node 101 may alternatively, or in addition, trigger the shutdown of equipment, such as the radio antenna 120 or the second node 102 entirely.

FIG. 4 schematically illustrates how to obtain the set of Doppler spectrum values, according to an example. In general terms, the Doppler spectrum may be calculated by a fast Fourier transform (FFT), of radio channel estimates over a relatively short period in the time domain. In more detail, FIG. 4(*a*) schematically indicates a time-frequency diagram of the radio channel on which radio waves have been transmitted between the second node 102 and the one wireless device 140. The FFT is determined for the time-frequency representation over time in a window of length w time units, resulting in the Doppler spectrum-frequency representation in FIG. 4(*b*). The Doppler spectrum-frequency representation is averaged over frequency, resulting in the average Doppler spectrum representation of FIG. 4(*c*). Alternatively, the Doppler spectrum in FIG. 4(*c*) may represent a single frequency of the Doppler spectrum-frequency representation in FIG. 4(*b*). This procedure may be repeated for multiple short periods of time resulting in the time varying Doppler spectrum of FIG. 4(*d*). Hence, multiple Doppler shifts may be determined from a short-term frequency transform of a time series of the radio channel estimates. The Time in FIGS. 4(*a*)-(*c*) corresponds to one value of the set of Doppler spectrum values. The set of Doppler spectrum values is illustrated in FIG. 4*d*

Figure 5:
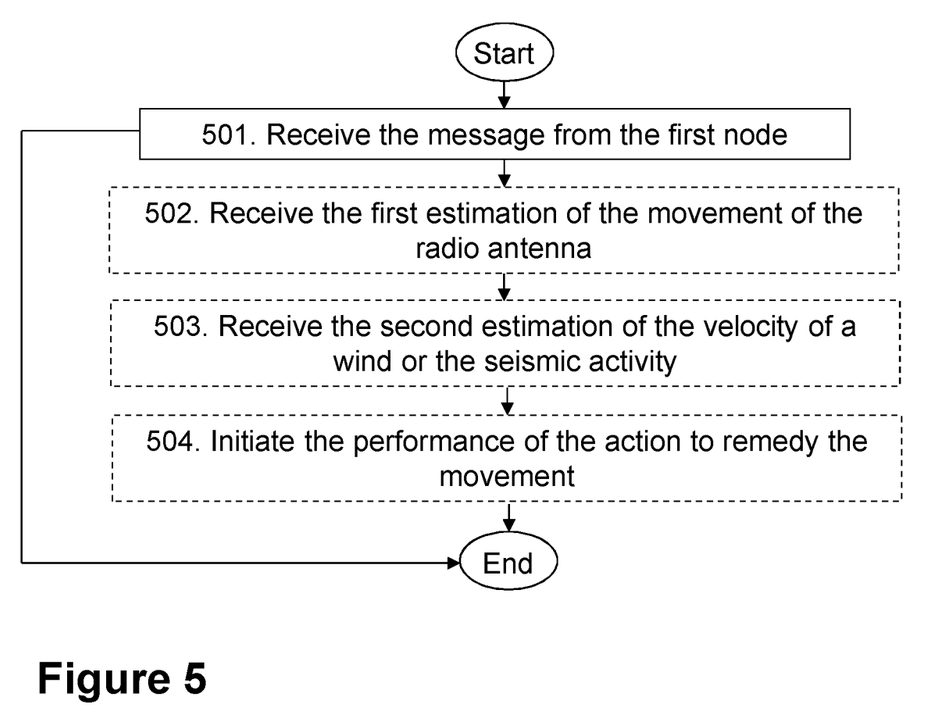
FIG. 5 is a flowchart depicting embodiments of a method in a third node, according to embodiments herein.

Embodiments of a method performed by the third node 103, the method being for managing the movement of the radio antenna 120, will now be described with reference to the flowchart depicted depicted in FIG. 5. The third node 103 operates in the wireless communications network 100.

The detailed description of some of the following corresponds to the same references provided above, in relation to the actions described for the first node 101, and will thus not be repeated here to simplify the description. For example, in examples wherein the radio transmissions may have been transmitted by the second node 102, the radio transmissions may be e.g., Cell Specific Reference Signal (CRS). In examples wherein the radio transmissions may have been transmitted by the at least one wireless device 140, the radio transmissions may be e.g., Sounding Reference Signals (SRS).

The method may comprise the actions described below. In some embodiments all the actions may be performed. In some embodiments, one or more actions may be performed. The order in which the actions are performed may be different than that depicted in FIG. 5. One or more embodiments may be combined, where applicable. All possible combinations are not described to simplify the description. In FIG. 5, optional actions are indicated with dashed lines.

Action 501

In order to enable the third node 103 to manage the movement of the radio antenna 120 being above the threshold by performing one or more remedial actions, in this Action 501, the third node 103 receives the message from the first node 101 operating in the wireless communications network 100. The reception of the message may be e.g., via the second link 152. The receiving 501 of the message is based on a result of the determination of whether the movement of the radio antenna 120 is above the threshold over the time period. As stated earlier, the radio antenna 120 is connected to the second node 102 operating in the wireless communications network 100. The movement is with respect to the at least one wireless device 140 operating in the wireless communications network 100. The determination is based on the analysis of the one or more properties of radio transmissions between the at least one wireless device 140 and the radio antenna 120 over the time period, as described earlier.

As described earlier, the radio transmissions may comprise reference signals. The radio transmissions may be one of: a) transmitted by the second node 102 and measured by at the least one wireless device 140; and b) transmitted by the at least one wireless device 140 and measured by the second node 102.

The analysis may be the Doppler spectrum analysis described above.

In some embodiments, the analysis may be based on: a) the measurements of at least the phase of the radio transmissions over the time period; b) the division of the obtained measurements in the subsets of periods of time comprised in the time period; and c) the Fourier transform over each of the subsets of periods of time. The determination may be further based on the set of Doppler spectrum values obtained from the Fourier transform over each of the subsets of periods of time.

The determination may be further based on the detection of the time-harmonic variation of the set of Doppler spectrum values.

In some embodiments, the message may comprise at least one of: a) the report regarding maintenance of the radio antenna 120; b) the report of the weather condition; and c) the report on the seismic activity.

Action 502

In embodiments wherein the determination may be further based on the detection of the time-harmonic variation of the set of Doppler spectrum values, the third node 103 may, in this Action 502, receive, from the first node 101, the first estimation of the movement of the radio antenna 120, e.g., in the form of a first indication of the first estimation. The reception of the first estimation may be e.g., via the second link 152. The first estimation may be based on at least one of: i) the calculation of the frequency of the movement of the radio antenna 120, based on time variations of the set of Doppler spectrum values, and ii) the calculation of the amplitude of the movement of the radio antenna 120, based on the values in the set of Doppler spectrum values.

This is an optional Action. If performed, it may be combined with any or both of Action 501 and Action 503 in a single Action.

Action 503

In this Action 503, the third node 103 may receive, based on the result of the determination, the second estimation of one of: the velocity of the wind 160 and the seismic activity e.g., in the form of a second indication of the second estimation. The receiving in this Action 503 may be e.g., via the second link 152.

This is an optional Action. If performed, it may be combined with any or both of Action 501 and Action 502 in a single Action.

Action 504

In this Action 504, the third node 103 may initiate performance of an action to remedy the movement of the radio antenna 120 being above the threshold over the time period. To initiate performance may be understood as to trigger the performance, e.g., by instructing another node to perform the action to remedy, or remedial action, or to autonomously perform the remedial action.

The action may comprise at least one of: i) shut down of the radio antenna 120; ii) a reorganization of an antenna grid comprising the radio antenna 120, and c) sending another message based on the report of the weather condition or the seismic activity.

Another action may be to adjust wire tension by adjusting turnbuckles of pole struts to reduce and/or minimize pole oscillations which may be harmful in the long run.

This is an optional Action, since the message may be an alarm in the form of e.g., a light signal, and the remedial action may then be taken by a user of the third node 103.

To summarize the foregoing in other words with a particular non-limiting example, embodiments herein may be understood to relate to identifying and classifying radio pole harmonic oscillations using Doppler analysis. Wind-induced pole harmonic oscillations may be identified enabling efficient radio site operations and pre-emptive maintenance. Wind-induced pole harmonic oscillations may be identified and used to report local weather conditions, such as wind. This may be done in combination with existing methods for judging rain intensity by signal path loss characteristics. Embodiments herein may be used for wide-area weather condition reporting, and potentially prediction.

One benefit of embodiments herein is that they enable low-cost and efficient radio site, pole, and radio antenna operations and pre-emptive maintenance by monitoring.

Another further advantage of embodiments herein is that they enable site-local weather reports, e.g., wind reports, or seismic reports.

Figure 6:
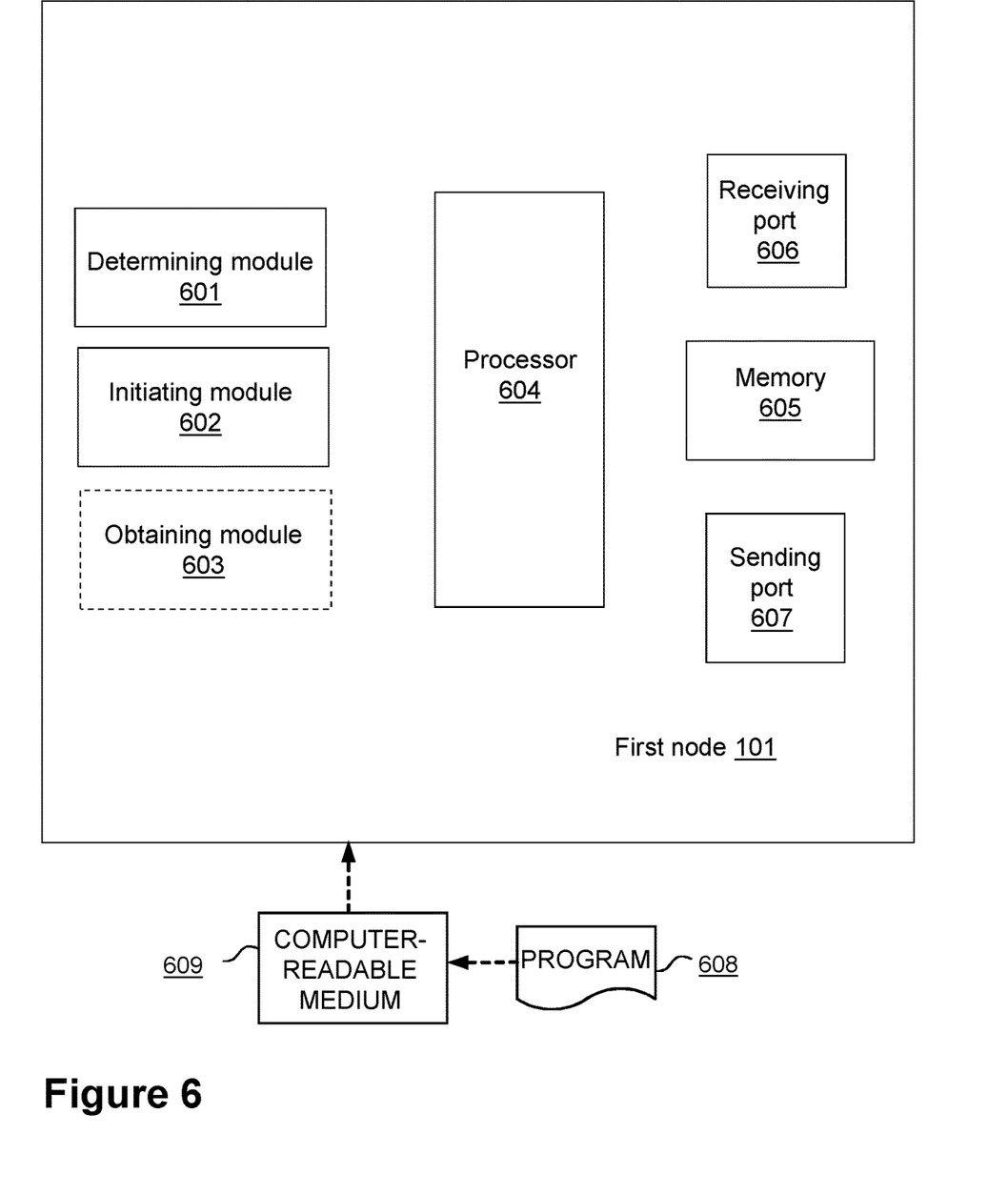
FIG. 6 is a schematic block diagram illustrating embodiments of a first node, according to embodiments herein.

To perform the method actions described above in relation to FIGS. 3 and 4, the first node 101 may comprise the following arrangement depicted in FIG. 6. The first node 101 is configured to manage the movement of the radio antenna 120. As stated earlier, the first node 101 is configured to operate in a wireless communications network 100.

The detailed description of some of the following corresponds to the same references provided above, in relation to the actions described for the first node 101, and will thus not be repeated here.

The first node 101 is further configured to, e.g. by means of a determining module 601 configured to, determine whether the movement of the radio antenna 120 is above the threshold over the time period, the radio antenna 120 being configured to be connected to the second node 102 configured to operate in the wireless communications network 100. The movement is with respect to the at least one wireless device 140 configured to operate in the wireless communications network 100. To determine being configured to be based on an analysis of one or more properties of the radio transmissions to or from the radio antenna 120 over the time period.

The analysis may be the Doppler spectrum analysis.

The radio transmissions may comprise reference signals. The radio transmissions may be configured to be one of: a) transmitted by the second node 102 and measured by the at least one wireless device 140; and b) transmitted by the at least one wireless device 140 and measured by the second node 102.

In some embodiments, the analysis may be configured to be based on: a) the measurements configured to be obtained of at least the phase of the radio transmissions over the time period; b) the division of the obtained measurements configured to be in the subsets of periods of time comprised in the time period; and c) the Fourier transform over each of the subsets of periods of time. To determine may be further configured to be based on the set of Doppler spectrum values configured to be obtained from the Fourier transform over each of the subsets of periods of time.

The first node 101 is further configured to, e.g., by means of an initiating module 602 configured to, initiate providing the message to one of: the second node 102 and the third node 103 configured to operate in the wireless communications network 100, the initiation of the providing of the message being configured to be based on the result of the determination.

In some embodiments, the message may be configured to trigger at least one of: a) the report regarding maintenance of the radio antenna 120; b) the shutdown of the radio antenna 120; c) the report of the weather condition; and d) the report on the seismic activity.

In some embodiments, the determination may be further configured to be based on the detection of the time-harmonic variation of the set of Doppler spectrum values. In some of such embodiments, the first node 101 may be further configured to, e.g., by means of an obtaining module 603 configured to, obtain the first estimation of the movement of the radio antenna 120. The first estimation may be configured to be based on at least one of: i) calculating the frequency of the movement of the radio antenna 120, based on time variations of the set of Doppler spectrum values, and ii) calculating the amplitude of the movement of the radio antenna 120, based on the values in set of Doppler spectrum values.

In some embodiments, the first node 101 may be further configured to, e.g., by means of the obtaining module 603 configured to, obtain, based on the result of the determination, the second estimation of one of: the velocity of the wind 160 and the seismic activity.

The embodiments herein in the first node 101 may be implemented through one or more processors, such as a processor 604 in the first node 101 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first node 101. One such carrier may be in the form of a CD ROM disc. It is however feasible with other data carriers such as a memory stick. The computer program code may furthermore be provided as pure program code on a server and downloaded to the first node 101.

The first node 101 may further comprise a memory 605 comprising one or more memory units. The memory 605 is arranged to be used to store obtained information, store data, configurations, schedulings, and applications etc. to perform the methods herein when being executed in the first node 101.

The first node 101 may comprise an interface unit to facilitate communications between the first node 101 and other nodes or devices, e.g., any of the second node 102, the third node 103, and the at least one wireless device 140. The interface may, for example, include a transceiver configured to transmit and receive radio signals over an air interface in accordance with a suitable standard.

In some embodiments, the first node 101 may receive information from, e.g., any of the second node 102, the third node 103, and the at least one wireless device 140, through a receiving port 606. In some embodiments, the receiving port 606 may be, for example, connected to one or more antennas in first node 101, such as the radio antenna 120, in some examples. In other embodiments, the first node 101 may receive information from another structure in the wireless communications network 100 through the receiving port 606. Since the receiving port 606 may be in communication with the processor 604, the receiving port 606 may then send the received information to the processor 604. The receiving port 606 may also be configured to receive other information.

The processor 604 in the first node 101 may be further configured to transmit or send information to e.g., any of the second node 102, the third node 103, and the at least one wireless device 140, through a sending port 607, which may be in communication with the processor 604, and the memory 605.

Those skilled in the art will also appreciate that the determining module 601, the initiating module 602, and the obtaining module 603, described above may refer to a combination of analog and digital modules, and/or one or more processors configured with software and/or firmware, e.g., stored in memory, that, when executed by the one or more processors such as the processor 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-603 described above may be implemented as one or more applications running on one or more processors such as the processor 604.

Thus, the methods according to the embodiments described herein for the first node 101 may be respectively implemented by means of a computer program 608 product, comprising instructions, i.e., software code portions, which, when executed on at least one processor 604, cause the at least one processor 604 to carry out the actions described herein, as performed by the first node 101. The computer program 608 product may be stored on a computer-readable storage medium 609. The computer-readable storage medium 609, having stored thereon the computer program 608, may comprise instructions which, when executed on at least one processor 604, cause the at least one processor 604 to carry out the actions described herein, as performed by the first node 101. In some embodiments, the computer-readable storage medium 609 may be a non-transitory computer-readable storage medium, such as a CD ROM disc, or a memory stick. In other embodiments, the computer program 608 product may be stored on a carrier containing the computer program 608 just described, wherein the carrier is one of an electronic signal, optical signal, radio signal, or the computer-readable storage medium 609, as described above.

Figure 7:
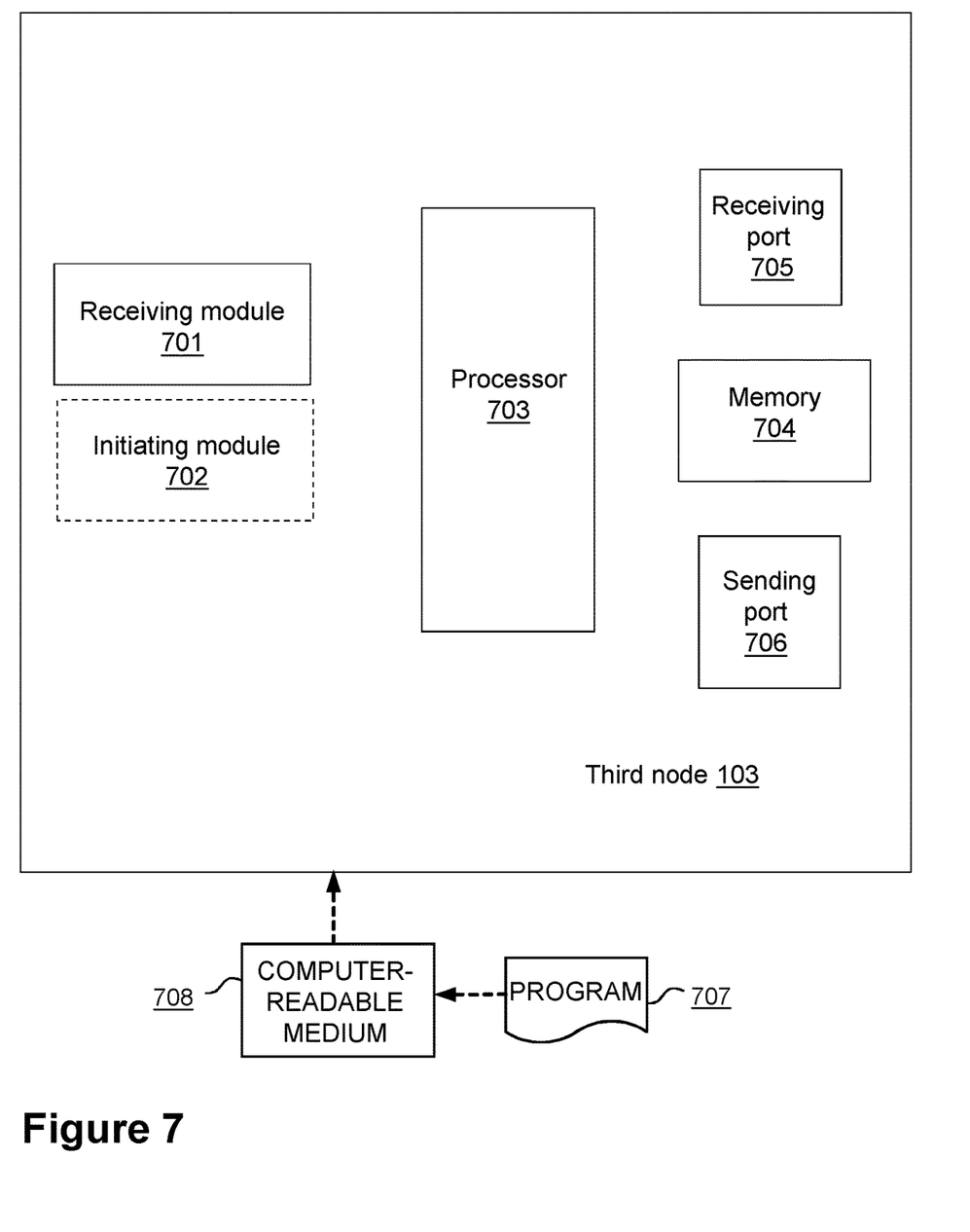
FIG. 7 is a schematic block diagram illustrating embodiments of a third node, according to embodiments herein.

To perform the method actions described above in relation to FIG. 5, the third node 103 may comprise the following arrangement depicted in FIG. 7. The third node 103 is configured to manage the movement of the radio antenna 120. As stated earlier, the third node 103 is configured to operate in a wireless communications network 100.

The detailed description of some of the following corresponds to the same references provided above, in relation to the actions described for the third node 103, and will thus not be repeated here.

The third node 103 is further configured to, e.g. by means of a receiving module 701 configured to, receive the message from the first node 101 configured to operate in the wireless communications network 100. To receive the message is configured to be based on the result of the determination of whether the movement of the radio antenna 120 is above the threshold over the time period. The radio antenna 120 is configured to be connected to the second node configured to operate in the wireless communications network 100. The movement is with respect to the at least one wireless device 140 configured to operate in the wireless communications network 100. The determination is configured to be based on the analysis of the one or more properties of the radio transmissions between the at least one wireless device 140 and the radio antenna 120 over the time period.

The analysis may be the Doppler spectrum analysis.

The radio transmissions may comprise reference signals. The radio transmissions may be configured to be one of: a) transmitted by the second node 102 and measured by the at least one wireless device 140; and b) transmitted by the at least one wireless device 140 and measured by the second node 102.

In some embodiments, the analysis may be configured to be based on: a) the measurements, configured to be obtained, of at least the phase of the radio transmissions over the time period; b) the division of the measurements configured to be in the subsets of periods of time comprised in the time period; and c) the Fourier transform over each of the subsets of periods of time. The determination may be further configured to be based on the set of Doppler spectrum values configured to be obtained from the Fourier transform over each of the subsets of periods of time.

In some embodiments, the message may be configured to comprise at least one of: a) the report regarding maintenance of the radio antenna 120; b) the report of the weather condition; and c) the report on the seismic activity.

In some embodiments, the determination may be further configured to be based on the detection of the time-harmonic variation of the set of Doppler spectrum values. In some of such embodiments, the third node 103 may be further configured to, e.g., by means of the receiving module 701 configured to, receive, from the first node 101, the first estimation of the movement of the radio antenna 120. The first estimation may be configured to be based on at least one of: i) the calculation of the frequency of the movement of the radio antenna 120, based on time variations of the set of Doppler spectrum values, and ii) the calculation of the amplitude of the movement of the radio antenna 120, based on the values in the set of Doppler spectrum values.

In some embodiments, the third node 103 may be further configured to, e.g., by means of the receiving module 701 configured to, receive, based on the result of the determination, the second estimation of one of: the velocity of the wind 160 and the seismic activity.

The third node 103 is further configured to, e.g., by means of an initiating module 702 configured to, initiate performance of the action to remedy the movement of the radio antenna 120 being above the threshold over the time period.

The action may be configured to comprise at least one of: i) shut down of the radio antenna 120; ii) the reorganization of the antenna grid comprising the radio antenna 120, and iii) sending the another message based on the report of the weather condition or the seismic activity.

The embodiments herein in the third node 103 may be implemented through one or more processors, such as a processor 703 in the third node 103 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the third node 103. One such carrier may be in the form of a CD ROM disc. It is however feasible with other data carriers such as a memory stick. The computer program code may furthermore be provided as pure program code on a server and downloaded to the third node 103.

The third node 103 may further comprise a memory 704 comprising one or more memory units. The memory 704 is arranged to be used to store obtained information, store data, configurations, schedulings, and applications etc. . . . to perform the methods herein when being executed in the third node 103.

The third node 103 may comprise an interface unit to facilitate communications between the third node 103 and other nodes or devices, e.g., any of the first node 101, the second node 102, and the at least one wireless device 140. The interface may, for example, include a transceiver configured to transmit and receive radio signals over an air interface in accordance with a suitable standard.

In some embodiments, the third node 103 may receive information from, e.g., any of the first node 101, the second node 102, and the at least one wireless device 140, through a receiving port 705. In some embodiments, the receiving port 705 may be, for example, connected to one or more antennas in third node 103. In other embodiments, the third node 103 may receive information from another structure in the wireless communications network 100 through the receiving port 705. Since the receiving port 705 may be in communication with the processor 703, the receiving port 705 may then send the received information to the processor 703. The receiving port 705 may also be configured to receive other information.

The processor 703 in the third node 103 may be further configured to transmit or send information to e.g., any of the first node 110, the second node 102, the third node 103, and the at least one wireless device 140, through a sending port 706, which may be in communication with the processor 703, and the memory 704.

Those skilled in the art will also appreciate that the receiving module 701 and the initiating module 702 described above may refer to a combination of analog and digital modules, and/or one or more processors configured with software and/or firmware, e.g., stored in memory, that, when executed by the one or more processors such as the processor 703, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-702 described above may be implemented as one or more applications running on one or more processors such as the processor 703.

Thus, the methods according to the embodiments described herein for the third node 103 may be respectively implemented by means of a computer program 707 product, comprising instructions, i.e., software code portions, which, when executed on at least one processor 703, cause the at least one processor 703 to carry out the actions described herein, as performed by the third node 103. The computer program 707 product may be stored on a computer-readable storage medium 708. The computer-readable storage medium 708, having stored thereon the computer program 707, may comprise instructions which, when executed on at least one processor 703, cause the at least one processor 703 to carry out the actions described herein, as performed by the third node 103. In some embodiments, the computer-readable storage medium 708 may be a non-transitory computer-readable storage medium, such as a CD ROM disc, or a memory stick. In other embodiments, the computer program 707 product may be stored on a carrier containing the computer program 707 just described, wherein the carrier is one of an electronic signal, optical signal, radio signal, or the computer-readable storage medium 708, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first node for managing a movement of a radio antenna, the first node operating in a wireless communications network, the method comprising:
   determining whether the movement of the radio antenna due to a velocity of a wind or a seismic activity is above a threshold over a time period,
      wherein the radio antenna is connected to a second node operating in the wireless communications network,
      wherein the movement is with respect to at least one wireless device operating in the wireless communications network,
      wherein the determining is based on an analysis of one or more properties of radio transmissions to or from the radio antenna over the time period, and
      wherein the analysis is based on:
         obtained measurements of at least a phase of the radio transmissions over the time period;
         a division of the obtained measurements in subsets of periods of time comprised in the time period;
         a Fourier transform over each of the subsets of periods of time; and
         wherein the determining is further based on a set of Doppler spectrum values obtained from the Fourier transform over each of the subsets of periods of time; and
   initiating the providing of a message to one of: the second node and a third node operating in the wireless communications network, wherein the initiation of the providing of the message is based on a result of the determination.

2. The method of claim 1, wherein the analysis is a Doppler spectrum analysis.

3. The method of claim 1, wherein the radio transmissions comprise reference signals, and wherein the radio transmissions are one of:
   transmitted by the second node and measured by the at least one wireless device; and
   transmitted by the at least one wireless device and measured by the second node.

4. The method of claim 1, wherein the determination is further based on a detection of a time-harmonic variation of the set of Doppler spectrum values, and wherein the method further comprises:
   obtaining a first estimation of the movement of the radio antenna, wherein the first estimation is based on at least one of:
      calculating a frequency of the movement of the radio antenna, based on time variations of the set of Doppler spectrum values, and
      calculating an amplitude of the movement of the radio antenna, based on the values in set of Doppler spectrum values.

5. The method of claim 1, wherein the method further comprises:
   obtaining, based on the result of the determination, a second estimation of one of: the velocity of the wind and the seismic activity.

6. The method of claim 1, wherein the message triggers at least one of:
   a report regarding maintenance of the radio antenna;
   shut down of the radio antenna;
   a report of a weather condition; and
   a report on seismic activity.

7. A first node configured for managing a movement of a radio antenna, wherein the first node is configured to operate in a wireless communications network, the first node comprising:
   interface circuitry configured to communicate with one or more other nodes of the wireless communications network; and
   processing circuitry operatively coupled to the interface circuitry, the processing circuitry comprising one or more processors and one or more memory circuits and wherein the processing circuitry is configured to:
      determine whether the movement of the radio antenna due to a velocity of a wind or a seismic activity is above a threshold over a time period,
         wherein the radio antenna is configured to be connected to a second node configured to operate in the wireless communications network,
         wherein the movement is with respect to at least one wireless device configured to operate in the wireless communications network,
         wherein the determining is based on an analysis of one or more properties of radio transmissions to or from the radio antenna over the time period, and
         wherein the analysis is configured to be based on:
            measurements configured to be obtained of at least a phase of the radio transmissions over the time period;
            a division of the obtained measurements in subsets of periods of time comprised in the time period;
            a Fourier transform over each of the subsets of periods of time; and
            wherein the determining is further based on a set of Doppler spectrum values obtained from the Fourier transform over each of the subsets of periods of time; and
      initiate providing a message to one of: the second node and a third node configured to operate in the wireless communications network, wherein the initiation of the providing of the message is configured to be based on a result of the determination.

8. The first node of claim 7, wherein the analysis is a Doppler spectrum analysis.

9. The first node of claim 7, wherein the radio transmissions comprise reference signals, and wherein the radio transmissions are configured to be one of:
   transmitted by the second node and measured by the at least one wireless device; and
   transmitted by the at least one wireless device and measured by the second node.

10. The first node of claim 7, wherein the determining is further based on a detection of a time-harmonic variation of the set of Doppler spectrum values, and wherein the first node is further configured to:
    obtain a first estimation of the movement of the radio antenna, wherein the first estimation is configured to be based on at least one of:
       calculating a frequency of the movement of the radio antenna, based on time variations of the set of Doppler spectrum values, and
       calculating an amplitude of the movement of the radio antenna, based on the values in set of Doppler spectrum values.

11. The first node of claim 7, wherein the first node is further configured to:
    obtain, based on the result of the determination, a second estimation of one of: the velocity of the wind and the seismic activity.

12. The first node of claim 7, wherein the message is configured to trigger at least one of:
    a report regarding maintenance of the radio antenna;
    shut down of the radio antenna;
    a report of a weather condition; and
    a report on seismic activity.

* * * * *